United States Patent
Bildhaeuser et al.

(10) Patent No.: US 7,512,591 B2
(45) Date of Patent: Mar. 31, 2009

(54) SYSTEM AND METHOD TO IMPROVE PROCESSING TIME OF DATABASES BY CACHE OPTIMIZATION

(75) Inventors: Hans-Juergen Bildhaeuser, Aidlingen (DE); Holger Karn, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/558,351

(22) Filed: Nov. 9, 2006

(65) Prior Publication Data
US 2007/0136238 A1 Jun. 14, 2007

(30) Foreign Application Priority Data
Dec. 9, 2005 (EP) .................. 05111904

(51) Int. Cl.
G06F 7/00 (2006.01)
G06F 17/30 (2006.01)
G06F 12/00 (2006.01)
G06F 13/00 (2006.01)
G06F 13/28 (2006.01)

(52) U.S. Cl. ........................... 707/2; 711/118
(58) Field of Classification Search .............. 707/2; 711/118
See application file for complete search history.

(56) References Cited

U.S. PATENT DOCUMENTS

| | | | |
|---|---|---|---|
| 5,394,531 A * | 2/1995 | Smith .................. | 711/136 |
| 5,452,440 A * | 9/1995 | Salsburg ............... | 711/136 |
| 5,606,688 A * | 2/1997 | McNutt et al. .......... | 711/170 |
| 5,608,890 A * | 3/1997 | Berger et al. .......... | 711/113 |
| 5,675,797 A | 10/1997 | Chung et al. | |
| 5,680,573 A | 10/1997 | Rubin et al. | |
| 5,732,240 A * | 3/1998 | Caccavale ............. | 711/118 |
| 5,822,749 A | 10/1998 | Agarwal | |
| 6,129,458 A | 10/2000 | Waters et al. | |

(Continued)

FOREIGN PATENT DOCUMENTS

JP  10320212  12/1998

OTHER PUBLICATIONS

Battiti, Roberto. "Reactive Search: Toward Self-Tuning Heuristics". Modern Heuristic Search Methods, ch. 4, II. 61-83. John Wiley and Sons Ltd, 1996. 23 pages.*

(Continued)

*Primary Examiner*—Apu M Mofiz
*Assistant Examiner*—Charles E Lu
(74) *Attorney, Agent, or Firm*—Kunzler & McKenzie

(57) ABSTRACT

A system and method are disclosed to improve processing time of a database system by continuous automatic background optimization of a cache memory that is fragmented into a plurality of cache fragments. The system and method include collecting indicators about efficiency of individual cache fragments by at least one of measuring a cache hit ratio of each cache fragment, measuring a processing time that a CPU of the database system needs to prepare data in the individual cache fragments, and measuring execution time the CPU needs to process the data in accordance with a SQL query. The system and method include calculating and revising approximation curves for measured values of each cache fragment to find a combination of cache fragment sizes with a highest system throughput. The system and method include changing the sizes of the cache fragments to receive highest system throughput.

14 Claims, 2 Drawing Sheets

U.S. PATENT DOCUMENTS

| | | | |
|---|---|---|---|
| 7,107,400 B2* | 9/2006 | Benhase et al. | 711/118 |
| 7,287,144 B2* | 10/2007 | Hama | 711/118 |
| 7,318,124 B2* | 1/2008 | Hama et al. | 711/118 |
| 2004/0193801 A1* | 9/2004 | Benhase et al. | 711/118 |

OTHER PUBLICATIONS

Santhanakrishnan et al. "GD-GhOST: A Goal-Oriented Self-Tuning Caching Algorithm." 2004 ACM Symposium on Applied Computing. pp. 1141-1145.*

Wu et al. "E-MACSC: A Novel Dynamic Cache Tuning Technique to Maintain the Hit Ratio Prescribed by the User in Internet Applications." Springer, 2006. pp. 65-72.*

Xi et al. "An Analytical Model for Buffer Hit Rate Prediction." IBM Canada Ltd., Communications and Information Technology Ontario (CITO) and the National Science and Engineering Research Council. (2001). 12 pages.*

Pitkow et al. "A Simple Yet Robust Caching Algorithm Based on Dynamic Access Patterns." Graphics, Visualization, & Usability Center, College of Computing, Georgia Institute of Technology. (1994). 8 pages.*

"5.4.1 Tuning Database Buffer Pools", http://publib.boulder.ibm.com/cgi-bin/bookmgr/BOOKS/dsnagj13/5.4.1?DT=20060120134741, 2006.

"Self Tuning Memory", DB2 http://publib.boulder.ibm.com/infocenter/db2luw/v9/topic/com.ibm.db2.udb.admin.doc/doc/c0021627.htm, Aug. 16, 2006.

Ahuja, Rav, "Introducing DB2 9, Part 3: Self-Tuning Memory in DB2 9", http://www-128.ibm.com/developerworks/db2/library/techarticle/dm-0606ahuja/index.html, Jun. 1, 2006.

Administration Guide: Chapter 26.Tuning DB2 Buffer, EDM, RID, and Sort Pools, http://publib.boulder.ibm.com/cgi-bin/bookmgr/BOOKS/dsnagj13/5.4.1?DT=20060120134741, Feb. 2006.

* cited by examiner

SYSTEM AND METHOD TO IMPROVE PROCESSING TIME OF DATABASES BY CACHE OPTIMIZATION

CROSS-REFERENCES TO RELATED APPLICATIONS

This application claims the right of priority under the Paris Convention to German Patent Application Number EP05111904 entitled "METHOD TO IMPROVE PROCESSING TIME OF DATABASES BY CACHE OPTIMIZATION" and filed on Dec. 9, 2005 for HANS-JUERGEN BILDHAEUSER and HOLGER KARN, which is incorporated herein by reference.

BACKGROUND OF THE INVENTION

1. Field of the Invention

The present invention relates to database systems comprising at least one disk storage and/or at least one tape storage, a Central Processing Unit ("CPU") and an assigned Random Access Memory ("RAM"). The invention particularly relates to data caching in such database systems, and more particularly to optimization of sizes of cache fragments of a cache memory of a database system in order to optimize the data throughput in the database system. Thereby data throughput means the number of transactions per time unit. Transactions are sequences of Structured Query Language ("SQL") queries for modification or readout of data of the database system.

2. Description of the Related Art

To improve exposure to database systems, particularly to accelerate processing time of such database systems, it is known to cache data of the disk or tape storage or to cache prepared data for SQL query processing in the RAM. In the following, the part of the RAM used to cache data is called cache memory. Queries and modifications via Structured Query Language ("SQL") are carried out using the cached data. Thereby a problem arises that it is very time consuming to cache data that is used seldom or never. Furthermore it is costly to provide cache memory for all data of the database. Currently setting up data caching in a database cache memory is extremely difficult.

From U.S. Pat. No. 5,822,749 it is known to use an optimizer for formulating an optimal buffer cache strategy for a given query. A buffer cache is a cache memory to be used to load and cache data from the disk or tape storage of a database system. Thereby the optimizer communicates with a buffer manager before a query plan is formulated. The optimizer queries the buffer manager for the purpose of determining whether the object of interest exists in its own cache fragment. If the object exists in its own cache fragment, the optimizer inquires as to how much of the cache fragment the object requires, together with the optimal Input/Output ("I/O") size for the cache fragment. Based on this information, the optimizer formulates the query plan with hints, which are ultimately passed to the buffer manager. Based on those hints received from the optimizer, the buffer manager can fine tune I/O, i.e. the cache management for the query. The drawback of this solution is, that the size of the cache memory and also its fragmentation, i.e. the number of cache fragments and also the size of the individual cache fragments has to be adjusted manually. Due to this, during usage of the database, the size of the cache memory and its fragmentation is fixed. The optimizer together with the buffer manager only decides in which order objects, or, if a cache fragment is smaller than an object, parts of objects are cached and how long they remain cached until they are deleted by reusing a particular cache fragment by caching another object.

From U.S. Pat. No. 5,680,573 it is known to cache objects of a database system, wherein different, fixed cache fragments are used to cache objects that are selected randomly and to cache objects that are selected non-randomly. The cache fragments used to cache the objects that are selected non-randomly are larger than the cache fragments used to cache the objects that are selected randomly. Thereby no optimization of the sizes of the cache fragments and/or of the cache itself takes place during operation of the database system.

From Japan Patent No. 10 320 212 A2, a method for cache optimization based on a cache miss ratio prediction is known. Thereby a cache simulation object program is used to simulate the cache miss ratio of a database. During operation of the database the size of the cache fragments is fixed according to the prediction gained by the simulation.

Furthermore it is known to group single objects or groups of objects to so called working sets. Such working sets are also known for queries or groups of queries.

From Japan Patent No. 7 271 674 A2 and from U.S. Pat. No. 6,129,458 methods for cache optimization are known, wherein if a working set that comprises a plurality of objects is larger than a cache fragment to be used to cache the working set, the working set is subdivided into working sub sets that are cached in different cache fragments.

According to the state of the art, the cache memory used to cache data of a database system has a fixed size. Such a cache memory can be fragmented into a plurality of cache fragments, each one to be used to cache a single or a group of objects of the database. Changing sizes of the cache memory and/or of the cache fragments can result in tremendous changes in system performance.

According to the state of the art, during operation of the database those cache fragments have either a fixed size or are resized dynamically based on very limited algorithms, which try to improve the system throughput by changing the cache fragments in a kind of trial-and-error principle. A known method to do so is to simply reduce the size of the best performing cache fragment and to increase the size of the worst performing cache fragment in regular intervals. Thereby only two cache fragments are changed per transaction, wherein most of the cache fragments remain unchanged. Furthermore the changes take place independent from previous analysis cycles, meaning that in a following cycle, the changes might be counterproductive. Due to this, the known method is not applicable to improve performance of database systems.

Today, figuring out an optimal configuration requires either re-simulating the whole workload for different cache fragment sizes and choosing the optimal configuration, or estimating the impact of fragment size changes. The first option normally takes hours of processing on a workstation, which makes it impossible to be used for a desirable automatic continuous background optimization. The later option depends on multiple factors and must be done for all objects and statements in the database, like e.g. tables, Materialized Query Tables ("MQTs"), indexes and the like, which makes it normally impossible for continuous manual optimization. Even if a Data Base Administrator ("DBA") has figured out a good configuration, the database workload changes very often, which then results in poor system throughput.

SUMMARY OF THE INVENTION

Object of the Invention

An object of the invention is to develop a method that improves performance of a database system.

DISCLOSURE OF THE INVENTION AND ITS ADVANTAGES

The object of the invention is met by a method to improve processing time of a database system by continuous automatic background optimization of a cache memory that is fragmented into a plurality of cache fragments, wherein said method is characterized in the steps of:
- measurement of the processing times a CPU needs to prepare data in the individual cache fragments and measurement of the execution times the CPU needs to process this data in accordance with a SQL query, i.e. measurement of the processing time of the database system to gain a result of a SQL query,
- measurement of values that are indicators for the efficiency of the cache memory e.g. by measuring cache fragment hit ratios, i.e. which data have been required to handle the SQL query and which of the data have been found in one or more cache fragments,
- computing approximation functions, e.g. approximation curves, for the measured values of each cache fragment, which describe the relation between hit ratio and the current size of a specific cache fragment,
- making a prediction about the efficiency of the cache memory depending on the size of the cache memory and/or its fragmentation, i.e. the number and/or sizes of the individual cache fragments, by using said approximation functions, to predict the total prepare time for all cache fragments as the sum of all approximation functions for a given combination of cache fragment sizes,
- using the prediction to determine a cache memory size and/or a cache memory fragmentation that provides a minimum of the processing times for the SQL query processed, i.e. a maximum of the data throughput, by searching for those combinations of cache fragments sizes, which have the lowest total prepare time over all cache fragments,
- changing the size of the cache memory and/or its fragmentation dynamically, according to the minimum of the processing time and the maximum of the data throughput determined.

Preparing data in the individual cache fragments can be done e.g. by loading data from a disk or tape storage in a buffer pool. Data in other caches of the database system than in the buffer pool are prepared by other actions. Here, the term SQL query also comprises transactions comprising sequences of SQL queries. Furthermore a result of a SQL query is e.g. a successful manipulation or readout of an object.

Making a prediction about the efficiency of the cache memory depending on the size of the cache memory and/or its fragmentation by using the approximation functions is done by mathematical transformations of the approximation functions that give an account of the processing times of data in each cache fragment that has been processed.

Changing the size of the cache and/or its fragmentation dynamically takes place in a way that the size of the cache memory, and/or the number and/or the sizes of the cache fragments are changed to achieve the lowest possible preparation times for data in the caches and thereby achieve the highest possible system throughput.

Said method, according to the invention, has the advantage over the state of the art, in that instead of the DBA, the database system is handling the data caching and the optimization of the cache size and/or the cache fragmentation internally and automatically without manual interaction. So an optimization for best system throughput is performed automatically and dynamically within the database system.

This advantage is achieved by measuring the efficiency of each cache fragment on a regular base and using approximation curves, to predict the optimal cache fragmentation with the highest system throughput. Doing so, the system will learn from the measurements and improve the precision of the cache hit ratio and system throughput prediction over time.

In a preferred embodiment of said invention, changing the size of the cache fragments dynamically takes place in a way that the total available cache memory size for caching data is distributed among the cache fragments, wherein the total size of the cache memory is not changed. By doing so, the advantage is achieved in that a database system that uses a dynamic change of the cache fragmentation according to the invention, requires the same overall cache memory size of a conventional database system. Therefore, the database system according to the invention provides a better overall performance. Furthermore, after a few number of queries are processed, the database system reaches its optimum since the optimization process affects all or most of all cache fragments in a very short period of time.

In another preferred embodiment of said invention, the first time or every first time the database system is used, the characteristics of the cache, e.g. the look ahead (which data is cached, the size of the cache memory, its fragmentation), the number and/or the sizes of the cache fragments, and the like are set in accordance with experience values or other approaches to determine a suitable cache fragmentation for the current workload. By doing so, a database system providing dynamic changing of the cache fragmentation according to the invention performs from the very first moment of usage at least as well as a database system according to the state of the art. In an additional preferred embodiment of said invention, measurement of the processing time a CPU needs to prepare data in the cache memory and to process this data and measurement of the efficiency of the cache memory take place continuously for each query.

In a particular preferred embodiment of said invention, instead of using the prediction to determine a cache size and/or a cache fragmentation that provides a minimum of the processing times only for the query processed, i.e. the last query processed, the prediction is used to determine a cache size and/or a cache fragmentation that provides a minimum of the processing times for a predefined number of queries processed. So it is possible that all queries processed in the last 15 minutes are considered. It is also possible to consider the last 10, 100, or 1000 queries. Those queries and/or the measured values being used to determine the cache efficiency, like the cache hit ratios assigned to those queries, preferably are stored in a history within the database system.

In a preferred embodiment of the invention, SQL queries and/or objects assigned to a particular query are grouped to working sets, wherein each of those working sets will get an exclusive cache fragment assigned. This allows prioritizing specific workloads over other workloads, e.g. by searching for cache fragment configurations with the highest system throughput that show the lowest prepare time for their assigned cache fragments. Thereby it is important to mention that several configurations with a similar system throughput can exist.

In another preferred embodiment of the invention, different approximation functions are used for different workloads of the database system. Thereby each cache fragment will have several approximation curves, each curve valid only in a specific time frame of a day, a week, a month or a year. This allows considering workload behavior for database systems having a varying workload over time.

In a particularly preferred embodiment of the invention, said method is performed by a computer program product stored on a computer usable medium comprising computer readable program means for causing a computer to perform the method mentioned above, when said computer program product is executed on a computer.

The foregoing, together with other objects, features, and advantages of this invention can be better appreciated with reference to the following specification, claims and drawings.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
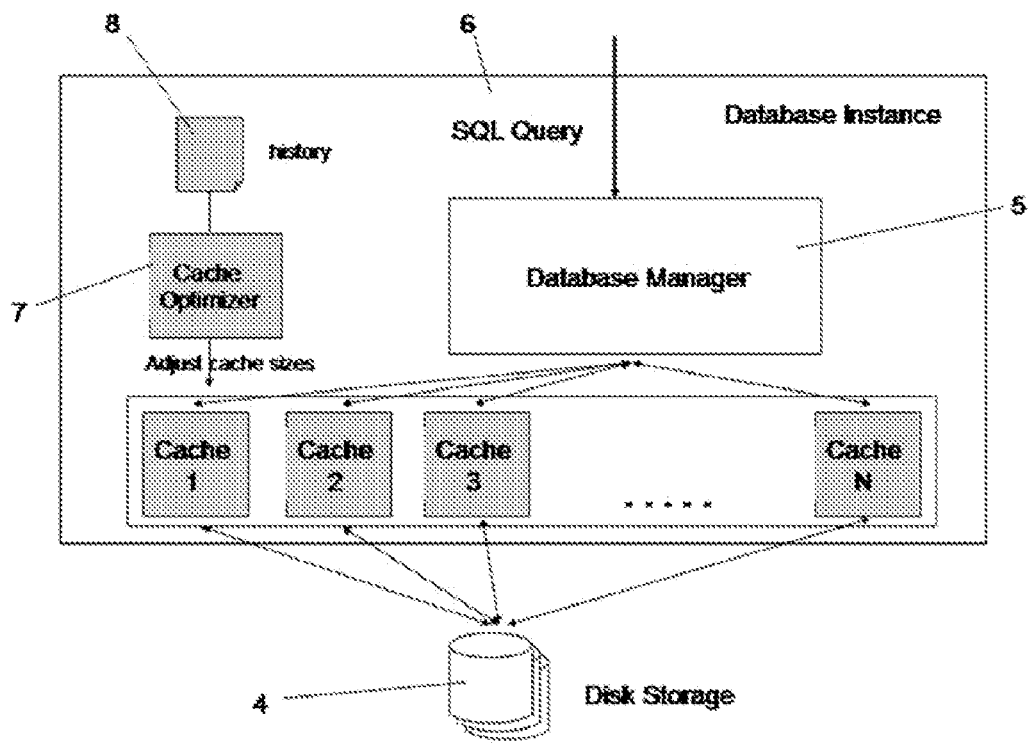
FIG. 1 is a schematic block diagram illustrating one embodiment of an architecture of a database in accordance with the present invention.

A database system shown in FIG. 1 comprises a Database Manager 5, a disk storage 4 and a cache memory for caching data of the disk storage 4, wherein the cache memory is fragmented into cache fragments 1, 2, 3, . . . , N, wherein the cache fragments can cache different types of data.

A database instance takes place by a SQL Query 6. The SQL Query 6 is addressed to the Database Manager 5. The Database Manager 5 handles the SQL Query 6 by accessing the relevant cache fragments 1, 2, 3, . . . , N providing data to be modified or prompted by the SQL Query 6. A SQL Query 6 or the handling of a SQL Query 6 by the Database Manager 5 does not directly access the disk storage 4. It always takes place using some of the cached data in some of the cache fragments 1, 2, 3, . . . , N. Caching data provides a better performance of databases by a faster accesses to the cache fragments 1, 2, 3, . . . , N, than to the disk storage 4, and by caching already prepared data instead of raw data.

Figure 2:
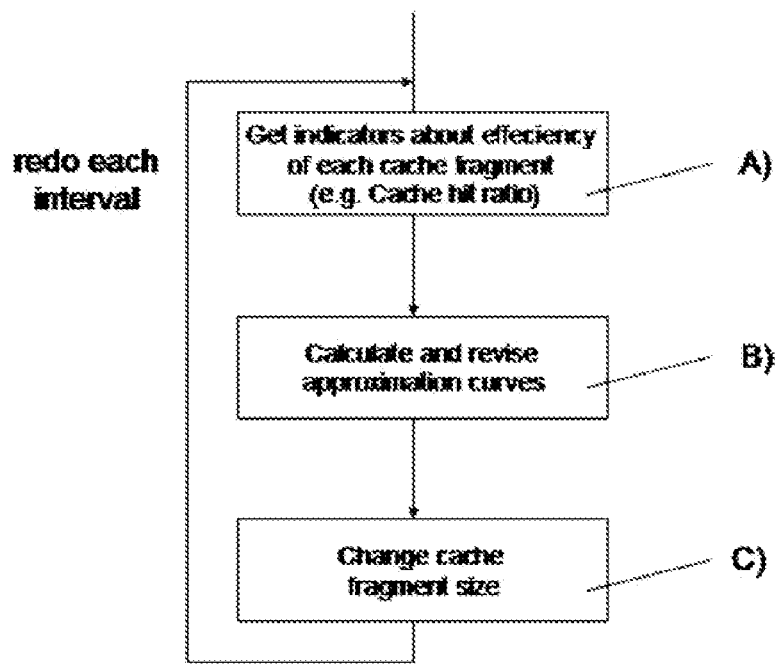
FIG. 2 is a schematic flow chart diagram illustrating one embodiment of a method for improving processing time of a database system by continuous automatic background optimization of a cache memory that is fragmented into a plurality of cache fragments in accordance with the present invention.

To improve the exposure to the database system, the fragmentation of the cache, i.e. the sizes of the cache fragments 1, 2, 3, . . . , N, is changed dynamically by a cache optimizer 7 performing a method according to the invention shown in FIG. 2. Therefore, it is possible not only to change the sizes of the cache fragments individually, but also to change the number of cache fragments. Changing the fragmentation of the cache dynamically means a procedure that is permanently, automatically and internally performed during the usage of the database system. The cache fragments are changed according to a prediction of impacts of changing the cache fragment sizes, which is based on historical information about the efficiency of the cache fragments in a history 8. The history 8 stores measured values of the efficiency of the cache and its fragmentation according to queries processed, e.g. queries processed in the last 15 minutes.

Changing the fragmentation of the cache dynamically is performed in the following way (FIG. 2):

In a first step A) indicators about the efficiency of the individual cache fragments are collected. This is done by measuring a cache hit ratio of each cache fragment, by measuring the processing time a CPU of the database system needs to prepare data in the individual cache fragments, by measuring the execution time the CPU needs to process this data in accordance with a SQL query, and the like. In a second step B) approximation curves for the measured values of each cache fragment are calculated and revised. The approximation curves for all cache fragments then are used to find a combination of cache fragment sizes with the lowest overall processing time and therefore with the highest system throughput. In a third step C) the sizes of the cache fragments are changed.

The steps A), B) and C) are repeated permanently e.g. in constant time intervals.

How to collect indicators about the efficiency of the individual cache fragments in detail is described in the following for a buffer pool cache fragment. However, the invention is not limited to a buffer pool cache, but can be applied to any database cache. Only the calculation of the efficiency of a cache fragment and thereby the indicators to collect will vary from cache to cache. Also the calculation of costs for a cache miss might vary for different caches.

Within each cycle, the following information will be tracked for each buffer pool cache fragment over a specific period of time, e.g. 15 minutes:
- IOTIME: total I/O Time for query executions, because page must be read synchronously from disk.
- GETPAGES: total number of pages read from buffer pool.
- SYNCRPAGES: total number of pages read synchronously from buffer pool.
- CFSIZE: current size of buffer pool cache fragment With the collected data for each cycle, the database system will calculate the current hit ratio HRCURRENT of each buffer pool cache fragment, as ratio of successful buffer pool page hits to total get page requests:

$$HRCURRENT=(GETPAGES-SYNCRPAGES)/GETPAGES*100$$

It is important to mention that if a different cache type than a buffer pool is observed, the equation for the hit ratio might be different. Those measured hit ratio will be stored together with the size of the buffer pool cache fragment CFSIZE in a history for each cache fragment.

Figure 3:
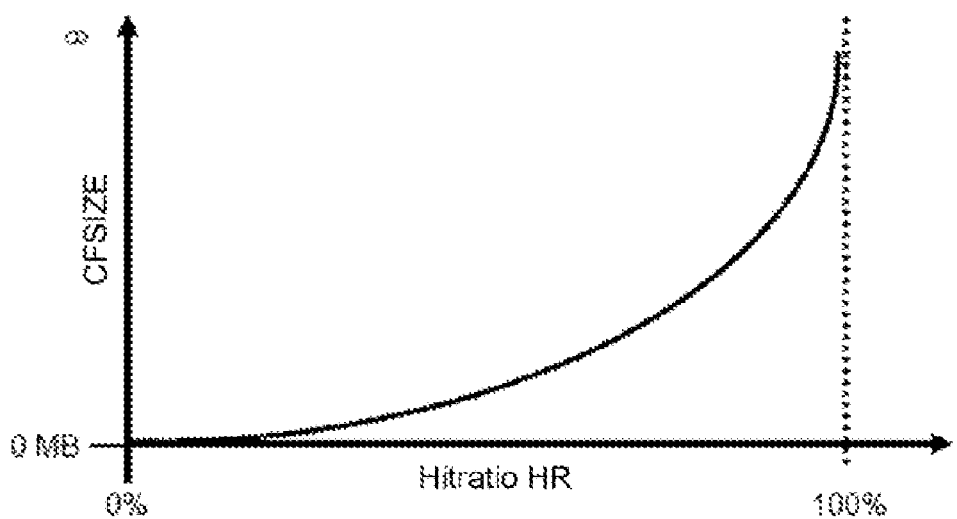
FIG. 3 is a schematic block diagram illustrating one embodiment of a normal relationship between a cache fragment hit ratio and a cache fragment size in accordance with the present invention.

FIG. 3 shows the normal relationship between cache fragment hit ratio $HR(CF_i, CFSIZE)$ and cache fragment size CFSIZE. This relationship is based upon an exponential function that can be described with the equation:

$$F(CF_i, x) = a*(1-e^{b*x/PI}).$$

Whereby x is the cache fragment size CFSIZE, F(CFi, x) is the resulting cache fragment hit ratio $HR(CF_i, CFSIZE)$ for a given buffer pool cache fragment $CF_i$, and b is a variable, which describes the gradient of the curve. PI is the Ludolph's Constant 3.14159 . . . , and the coefficient a is a constant correction factor.

The more the cache memory and/or the sizes of the buffer pool cache fragments are increased, the higher the hit ratio gets, wherein the hit ratio $HR(CF_i, CFSIZE)$ never exceeds 100%. Due to this, the coefficient "a" is 100 in the equation above. The resulting exponential function for a given buffer pool cache fragment $CF_i$ is:

$$HR(CF_i, CFSIZE)=100*(1-e^{b*CFSIZE/PI}).$$

Knowing the exponential curve equation and using the previously measured buffer pool cache fragment efficiencies, it is possible to calculate the value for variable b for the exponential curve, which describes the best buffer pool cache fragment behavior. This could be done for example by applying a Gauss error distribution curve on the measured values. The values of the variables of the equation above are searched having the minimum square deviation from the measured hit ratios HRCURRENT according to:

$$SUM(j=1\ to\ m)[(y_j-HR(CF_i,CFSIZE))^2]$$

Whereby $y_i$ is a previously measured hit ratio HRCURRENT at a given buffer pool cache fragment size CFSIZE, m is the number of previously measured hit ratios and $HR(CF_i,CFSIZE)$ is the predicted hit ratio for the given buffer pool cache fragment size CFSIZE at $y_i$. Many mathematical approaches are known to calculate an approximation curve for a set of measured values. Thereby the invention is not limited to the described way. Finally the best value for the variable b is determined.

According to the invention, it is possible that each cache fragment will have several approximation curves, each curve valid only in a specific time frame of a day, a week, a month or a year. This allows describing the workload behavior for systems having several workloads running over e.g. a day. A typical example of such different workloads for a database system is Online Transaction Processing ("OLTP") and batch window. During day, normal online queries (OLTP) are executed, while during night a mass data manipulation in the so called batch mode occurs. Both workloads may have a totally different cache usage.

Figure 4:
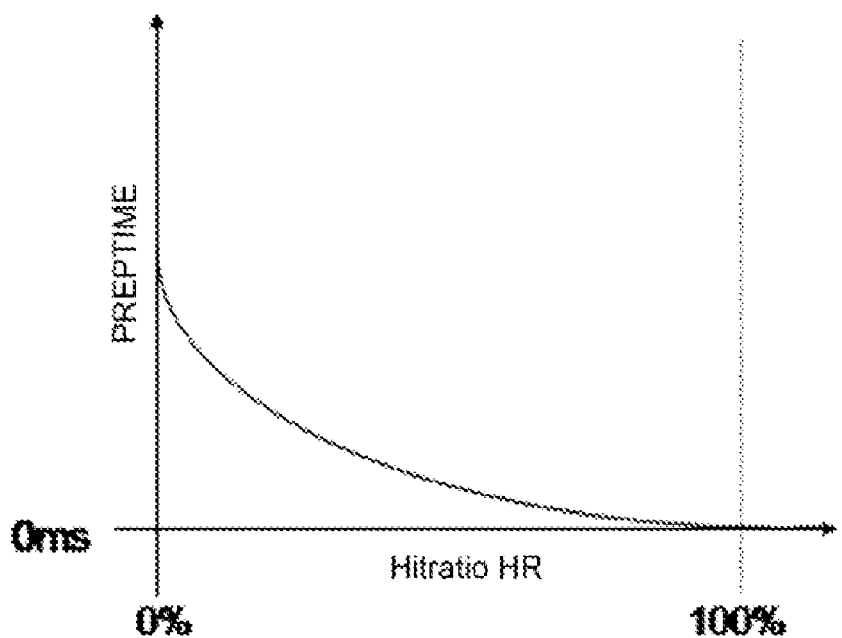
FIG. 4 is a schematic block diagram illustrating one embodiment of a typical data preparation time, depending on a cache fragment hit ratio.

FIG. 4 shows the typical progression of data preparation time PREPTIME depending on the cache fragment hit ratio $HR(CF_i,CFSIZE)$. In the buffer pool example mentioned above, the preparation time is the sum of the time to read the pages not in cache from disk, i.e. the I/O time, plus the time spent in processing the accessed data in the cache fragment. If a hit ratio $HR(CF_i,CFSIZE)$ of 100% exists, all get page requests, i.e. all requests on data, are fulfilled from the buffer pool and there is no I/O at all. If the cache fragment hit ratio $HR(CF_i,CFSIZE)$ of a buffer pool is 0%, I/O has to be done for each get page request, i.e. no requests on data are fulfilled from the buffer pool.

With this, it is possible to derive the preparation time PREPTIME, which can be enhanced by improving the cache fragment hit ratio, from the cache fragment hit ratio equation $HR(CF_i)$:

$$PREPTIME(CF_i)=(HR(CF_i)*COSTS(CF_i))$$

Whereby $COSTS(CF_i)$ is the cost in processing time for a given cache fragment $CF_i$. For the buffer pool example, the costs are the times spend in reading data pages from disk:

$$COSTS(CF_i)=GETPAGES*RDPAGETIME(BP_i))$$

Whereby $RDPAGETIME(BP_i)$ is the time to read a data page from disk into a buffer pool cache fragment $BP_i$ and GETPAGES is the total number of accessed pages in the buffer pool, i.e. the total number of pages read from the buffer pool. This cost equation depends on the type of cached data and might vary from cache type to cache type. After at least one completed cycle, it is possible to calculate the average time to read one page from disk RDPAGETIME for each buffer pool cache fragment $BP_i$:

$$RDPAGETIME(BP_i)=IOTIME(BP_i)/SYNCRPAGES(BP_i).$$

Over time, the system will get more and more measured values for the efficiency indicators and their current cache fragment sizes. Therefore over time, the approximation curve for the cache fragments set will be improved.

With the approximation curves for the cache fragment hit ratios, the system will calculate the depending curve for preparation time of cache fragment. Based on the curves, the system will figure out the optimal cache fragment sizes for all cache fragments with the lowest total preparation time across all cache fragments which use all of the for the total cache available memory. Depending on those results the cache fragments are changed accordingly.

Obviously the whole approach depends on the quality of the approximation curve. However at system start-up, no measured values exist to calculate approximation curves. What is known is the minimum size for each cache fragment, which is '0', and the maximum useful size MAXCFSIZE for the cache fragment, that is the size for which all accessed data would fit into the cache fragment:

MAXCFSIZE($CF_i$)=GETPAGES($CF_i$)*PAGESIZE ($CF_i$)

Certainly, if a cache fragment is bigger than MAXCFSIZE, cache memory is wasted because all the accessed data can already be held in the cache fragment. Considering those two extremes, a linear interrelation can be used for the first cycle.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for improved processing time of a database system by continuous automatic background optimization of a cache memory that is fragmented into a plurality of cache fragments, the computer implemented method comprising:

collecting indicators about efficiency of individual cache fragments by at least one of measuring a cache hit ratio of each cache fragment, measuring a processing time that a central processor unit ("CPU") of the database system needs to prepare data in the individual cache fragments, and measuring execution time the CPU needs to process the data in accordance with a Structured Query Language ("SQL") query, wherein the hit ratio, HRCURRENT, of a cache fragment, $CF_i$, is measured as an indicator for the efficiency of the cache memory of a buffer pool according to

HRCURRENT=(GETPAGES−SYNCRPAGES)/ GETPAGES*100 where GETPAGES is a total number of pages read from the buffer pool, SYNCRPAGES is a total number of pages read synchronously from the buffer pool and an approximation function HR($CF_i$, CFSIZE) for the cache fragment hit ratio is computed according to HR($CF_i$,CFSIZE)=100*(1−$e^{b*CFSIZE/PI}$), where CFSIZE is a cache fragment size, PI is Ludolph's Constant, wherein for predicting the efficiency of the cache memory using the approximation function, the value for variable b for the exponential curve is determined, which describes a best buffer pool cache fragment behavior according to the measured hit ratio HRCURRENT, and by then knowing the variable b, the approximation function HR($CF_i$, CFSIZE) is used to determine at least one of a cache size and a cache fragmentation that provides a minimum of the processing times for the query processed;

calculating approximation curves for measured values of each cache fragment based on the efficiency indicators;

determining a combination of cache fragment sizes from the approximation curves that yields a highest system throughput; and changing the sizes of the cache fragments to match the combination of cache fragment sizes that yields a highest system throughput.

2. The computer implemented method of claim 1, wherein the computer implemented method repeats automatically for each query.

3. The computer implemented method of claim 1, wherein the value for variable b for the exponential curve is determined by applying a Gauss error distribution curve on the measured hit ratio values HRCURRENT.

4. The computer implemented method of claim 1, wherein determining the value for variable b for the exponential curve by applying a Gauss error distribution curve, the values of the variables of the equation for the cache fragment hit ratio HR($CF_i$,CFSIZE)=100*(1−$e^{b*CFSIZE/PI}$)

are searched having a minimum square deviation from the measured hit ratios HRCURRENT according to SUM($j$=1 to $m$)[($y_j$−HR($CF_i$,CFSIZE))$^2$], wherein $y_i$ is a previously measured hit ratio HRCURRENT at a given buffer pool cache fragment size CFSIZE, m is the number of previously measured hit ratios and HR($CF_i$,CFSIZE) is the predicted hit ratio for the given buffer pool cache fragment size at $y_i$.

5. A computer program product comprising a computer readable storage medium having computer usable program code programmed for improved processing time of a database system by continuous automatic background optimization of a cache memory that is fragmented into a plurality of cache fragments, the operations of the computer program product comprising:

measuring processing times that a central processor unit ("CPU") requires to prepare data in individual cache fragments and to process the data in accordance with a Structured Query Language ("SQL") query;

measuring indicators of efficiency of the cache memory;

computing an approximation function for the measured efficiency indicators for each cache fragment, wherein the approximation function describes a relation between hit ratio and a current size of a specific cache fragment, wherein the hit ratio, HRCURRENT, of a cache fragment, $CF_i$, is measured as an indicator for the efficiency of the cache memory of a buffer pool according to

HRCURRENT=(GETPAGES−SYNCRPAGES)/ GETPAGES*100 where GETPAGES is a total number of pages read from the buffer pool, SYNCRPAGES is a total number of pages read synchronously from the buffer pool and an approximation function HR($CF_i$, CFSIZE) for the cache fragment hit ratio is computed according to HR($CF_i$,CFSIZE)=100*(1−$e^{b*CFSIZE/PI}$), where CFSIZE is a cache fragment size, PI is Ludolph's Constant, wherein for predicting the efficiency of the cache memory using the approximation function, the value for variable b for the exponential curve is determined which describes a best buffer pool cache fragment behavior according to the measured hit ratio HRCURRENT, and by then knowing the variable b, the approximation function HR(CF$_i$, CFSIZE) is used to determine at least one of a cache size and a cache fragmentation that provides a minimum of the processing times for the query processed;

making an efficiency prediction for the cache memory by using the approximation function, wherein the efficiency prediction predicts a total prepare time for all cache fragments as a sum of all approximation functions for a given combination of cache fragment sizes;

using the efficiency prediction to determine one of a cache memory size and a cache memory fragmentation, either of which provides a minimum of processing times for the query processed by searching for those combinations of cache fragments sizes which have a lowest total prepare time over all cache fragments; and changing a size of one of the cache memory and the cache memory fragmentation dynamically according to the minimum determined.

6. The computer program product of claim 5, wherein changing one of the size of the cache memory and the cache memory fragmentation dynamically further comprises changing the cache memory fragmentation dynamically wherein a total available cache memory size for caching data is distributed among the cache fragments and a total size of the cache memory remains constant.

7. The computer program product of claim 5, wherein at least a first time the database is used, characteristics of the cache are set in accordance with experience values.

8. The computer program product of claim 5, wherein measuring processing times that the CPU requires to prepare data in individual cache fragments and to process the data in accordance with a SQL query and measuring values that are indicators for an efficiency of a cache memory occur continuously for each query.

9. The computer program product of claim 5, wherein using the efficiency prediction to determine one of a cache memory size and a cache memory fragmentation for a query further comprises using the efficiency prediction to determine one of a cache memory size and a cache memory fragmentation for a predetermined number of queries.

10. The computer program product of claim 5, wherein one of SQL queries and objects assigned to a particular query is grouped with at least one working set.

11. The computer program product of claim 5, wherein different approximation functions are used for different workloads of the database system.

12. A system for improved processing time of a database system by continuous automatic background optimization of a cache memory that is fragmented into a plurality of cache fragments, the system comprising:

a central processor unit ("CPU");
at least one disk storage device;
a database manager that receives a Structured Query Language ("SQL") query and to access the cache memory in response to the query and to access the at least one disk storage device in response to the query and data required by the query not residing in the cache memory; and a cache optimizer that
measures processing times that the CPU requires to prepare data in the individual cache fragments and to process the data in accordance with the query;
measures indicators of efficiency of the cache memory;
computes an approximation function for the measured efficiency indicators for each cache fragment, wherein the approximation function describes a relation between hit ratio and a current size of a specific cache fragment wherein the hit ratio, HRCURRENT, of a cache fragment, CF$_i$, is measured as an indicator for the efficiency of the cache memory of a buffer pool according to

HRCURRENT=(GETPAGES−SYNCRPAGES)/GETPAGES*100 where GETPAGES is a total number of pages read from the buffer pool, SYNCRPAGES is a total number of pages read synchronously from the buffer pool and an approximation function HR(CF$_i$, CFSIZE) for the cache fragment hit ratio is computed according to HR(CF$_i$,CFSIZE)=100*(1−e$^{b*CFSIZE/PI}$), where CFSIZE is a cache fragment size, PI is Ludolph's Constant, wherein for predicting the efficiency of the cache memory using the approximation function, the value for variable b for the exponential curve is determined, which describes a best buffer pool cache fragment behavior according to the measured hit ratio HRCURRENT, and by then knowing the variable b, the approximation function HR(CF$_i$, CFSIZE) is used to determine at least one of a cache size and a cache fragmentation that provides a minimum of the processing times for the query processed;

makes an efficiency prediction for the cache memory by using the approximation function, wherein the efficiency prediction predicts a total prepare time for all cache fragments as a sum of all approximation functions for a given combination of cache fragment sizes;

uses the efficiency prediction to determine one of a cache memory size and a cache memory fragmentation, either of which provides a minimum of processing times for the query processed by searching for those combinations of cache fragments sizes which have a lowest total prepare time over all cache fragments; and changes a size of one of the cache memory and the cache memory fragmentation dynamically according to the minimum determined.

13. The system of claim 12, further comprising a history containing indicators of efficiency of the cache memory.

14. The system of claim 13, wherein the history contains cache memory hit rates for individual cache fragments and the cache optimizer uses the cache memory hit rates to compute the approximation function.

* * * * *